(12) United States Patent
Fannon et al.

(10) Patent No.: US 8,293,317 B2
(45) Date of Patent: Oct. 23, 2012

(54) PUFFED PROTEIN BASED SNACK FOOD

(76) Inventors: John E. Fannon, St. Louis, MO (US); Phillip I. Yakubu, St. Louis, MO (US)

( * ) Notice: Subject to any disclaimer, the term of this patent is extended or adjusted under 35 U.S.C. 154(b) by 146 days.

(21) Appl. No.: 12/288,369

(22) Filed: Oct. 20, 2008

(65) Prior Publication Data

US 2009/0087536 A1 Apr. 2, 2009

Related U.S. Application Data

(63) Continuation of application No. 10/987,918, filed on Nov. 12, 2004, now abandoned, which is a continuation of application No. 09/969,678, filed on Oct. 3, 2001, now abandoned.

(51) Int. Cl.
A23J 1/00 (2006.01)
(52) U.S. Cl. ........ 426/656; 426/634; 426/445; 426/447; 426/448
(58) Field of Classification Search .......... 426/634, 426/656, 445, 447, 448
See application file for complete search history.

(56) References Cited

U.S. PATENT DOCUMENTS

| | | |
|---|---|---|
| 3,488,770 A | 1/1970 | Atkinson |
| 3,730,729 A | 1/1973 | Strommer |
| 3,753,728 A * | 8/1973 | Bedenk et al. ............ 426/44 |
| 3,814,823 A | 6/1974 | Yang et al. |
| 3,886,298 A | 5/1975 | Hayes, Jr. et al. |
| 3,911,141 A | 10/1975 | Farr et al. |
| 3,911,157 A | 10/1975 | Bates et al. |
| 3,914,457 A | 10/1975 | Nagel et al. |
| 3,917,876 A | 11/1975 | Harwood et al. |
| 3,925,565 A | 12/1975 | Reinhart et al. |
| 3,950,564 A | 4/1976 | Puski et al. |
| 3,958,032 A | 5/1976 | Merriam |
| 3,965,268 A | 6/1976 | Stocker et al. |
| 3,970,761 A | 7/1976 | Wenger et al. |
| 3,988,485 A | 10/1976 | Hibbert et al. |
| 4,000,331 A | 12/1976 | Tanaka et al. |
| 4,001,441 A | 1/1977 | Liepa et al. |
| 4,001,459 A | 1/1977 | Kim et al. |
| 4,042,715 A | 8/1977 | Wenger et al. |
| 4,045,590 A | 8/1977 | Weigle et al. |
| 4,068,008 A | 1/1978 | Orchard |
| 4,084,017 A | 4/1978 | Kim et al. |
| 4,103,034 A | 7/1978 | Ronai et al. |
| 4,125,635 A | 11/1978 | de Ruyter |
| 4,166,138 A | 8/1979 | Ziminski et al. |
| 4,185,123 A | 1/1980 | Wenger et al. |

(Continued)

FOREIGN PATENT DOCUMENTS

EP 0180281 7/1986

(Continued)

OTHER PUBLICATIONS

Office Action from United States Patent and Trademark Office for U.S. Appl. No. 11/286,754; Jun. 24, 2009.

(Continued)

*Primary Examiner* — Anthony Weier

(57) ABSTRACT

A food product and method are provided. The food product is a crisp expanded proteinacious food product characterized by an absence of objectionable protein fiber formation. The product is puffed to provide a low density while providing a good eating texture. The product may be coated to provide additional flavors and/or nutrients.

33 Claims, 2 Drawing Sheets

U.S. PATENT DOCUMENTS

| | | | |
|---|---|---|---|
| 4,196,222 A | 4/1980 | Cheney | |
| 4,205,415 A | 6/1980 | Orchard | |
| 4,208,436 A | 6/1980 | Visser et al. | |
| 4,226,890 A | 10/1980 | Howard | |
| 4,230,738 A | 10/1980 | Shemer et al. | |
| 4,245,552 A | 1/1981 | Small et al. | |
| 4,277,513 A | 7/1981 | Ruffer et al. | |
| 4,305,965 A | 12/1981 | Cheney | |
| 4,310,558 A | 1/1982 | Nahm, Jr. et al. | |
| 4,324,807 A | 4/1982 | Kim et al. | |
| 4,346,652 A | 8/1982 | de Ruyter | |
| 4,536,406 A | 8/1985 | Brander et al. | |
| 4,559,233 A | 12/1985 | Chen et al. | |
| 4,559,236 A | 12/1985 | Okada | |
| 4,562,082 A | 12/1985 | Morimoto | |
| 4,563,362 A | 1/1986 | Thomas et al. | |
| 4,740,379 A | 4/1988 | Noguchi et al. | |
| 4,743,460 A | 5/1988 | Gellman et al. | |
| 4,888,198 A | 12/1989 | Beery et al. | |
| 5,034,232 A | 7/1991 | Sugitani et al. | |
| 5,048,405 A | 9/1991 | Takahashi et al. | |
| 5,165,949 A | 11/1992 | Farnsworth et al. | |
| 5,198,261 A | 3/1993 | Sasaki et al. | |
| 5,437,885 A | 8/1995 | Lusas et al. | |
| 5,538,748 A | 7/1996 | Boatman et al. | |
| 5,665,419 A | 9/1997 | Teraguchi et al. | |
| 6,187,367 B1 | 2/2001 | Cho et al. | |
| 6,355,295 B1 | 3/2002 | Altemueller et al. | |
| 6,582,746 B2 | 6/2003 | Altemueller et al. | |
| 6,635,301 B1 | 10/2003 | Howsam | |
| 6,777,017 B2 | 8/2004 | Porter et al. | |
| 7,597,921 B2 | 10/2009 | Walsh et al. | |
| 2003/0064145 A1 | 4/2003 | Fannon | |
| 2005/0058759 A1 | 3/2005 | Schmidt | |
| 2005/0089623 A1 | 4/2005 | Fannon | |

FOREIGN PATENT DOCUMENTS

| | | | |
|---|---|---|---|
| EP | 0212292 | | 3/1987 |
| EP | 0296963 | | 12/1988 |
| EP | 0398315 | | 2/1994 |
| FR | 2705534 | | 2/1994 |
| GB | 1335596 | | 10/1973 |
| GB | 1470047 | | 4/1977 |
| GB | 1503420 | * | 8/1978 |
| GB | 2001001 | | 1/1979 |
| GB | 1544812 | | 4/1979 |
| GB | 2004726 | | 4/1979 |
| GB | 1568353 | | 5/1980 |
| GB | 1587150 | | 4/1981 |
| GB | 1587194 | | 4/1981 |
| WO | 9202147 | | 2/1992 |

OTHER PUBLICATIONS

Office Action from United States Patent and Trademark Office for U.S. Appl. No. 11/286,753; Dec. 27, 2010.
Office Action from United States Patent and Trademark Office for U.S. Appl. No. 11/286,753; Mar. 17, 2010.
Office Action from United States Patent and Trademark Office for U.S. Appl. No. 11/286,755; Dec. 29, 2010.
Office Action from United States Patent and Trademark Office for U.S. Appl. No. 11/286,755; Jun. 11, 2010.
Office Action from United States Patent and Trademark Office for U.S. Appl. No. 09/969,678; Oct. 2, 2003.
Office Action from United States Patent and Trademark Office for U.S. Appl. No. 09/969,678; Feb. 3, 2004.
Office Action from United States Patent and Trademark Office for U.S. Appl. No. 09/969,678; May 13, 2004.
Office Action from United States Patent and Trademark Office for U.S. Appl. No. 11/286,755; Jul. 10, 2009.
Office Action from United States Patent and Trademark Office for U.S. Appl. No. 11/286,755; May 21, 2009.
Office Action from United States Patent and Trademark Office for U.S. Appl. No. 10/817,741; Jan. 11, 2006.
Office Action from United States Patent and Trademark Office for U.S. Appl. No. 11/286,755; Jun. 24, 2009.
Office Action from United States Patent and Trademark Office for U.S. Appl. No. 09/969,678; Nov. 8, 2004.
Office Action from United States Patent and Trademark Office for U.S. Appl. No. 10/764,275; Nov. 4, 2004.
Office Action from United States Patent and Trademark Office for U.S. Appl. No. 10/764,275; Aug. 30, 2005.
Office Action from United States Patent and Trademark Office for U.S. Appl. No. 10/764,275; Nov. 15, 2005.
Office Action from United States Patent and Trademark Office for U.S. Appl. No. 10/764,275; Jul. 27, 2006.
Office Action from United States Patent and Trademark Office for U.S. Appl. No. 10/817,741; Oct. 3, 2006.
Office Action from United States Patent and Trademark Office for U.S. Appl. No. 10/817,741; May 3, 2007.
Office Action from United States Patent and Trademark Office for U.S. Appl. No. 10/987,918; Oct. 24, 2008.
Office Action from United States Patent and Trademark Office for U.S. Appl. No. 10/987,918; Jun. 20, 2008.
Office Action from United States Patent and Trademark Office for U.S. Appl. No. 10/987,918; Dec. 13, 2007.
Office Action from United States Patent and Trademark Office for U.S. Appl. No. 10/987,918; Dec. 28, 2007.
Office Action from United States Patent and Trademark Office for U.S. Appl. No. 10/987,918; Jul. 25, 2007.
Office Action from United States Patent and Trademark Office for U.S. Appl. No. 10/987,918; Jul. 11, 2006.
Office Action from United States Patent and Trademark Office for U.S. Appl. No. 11/286,753; Jul. 14, 2009.

* cited by examiner

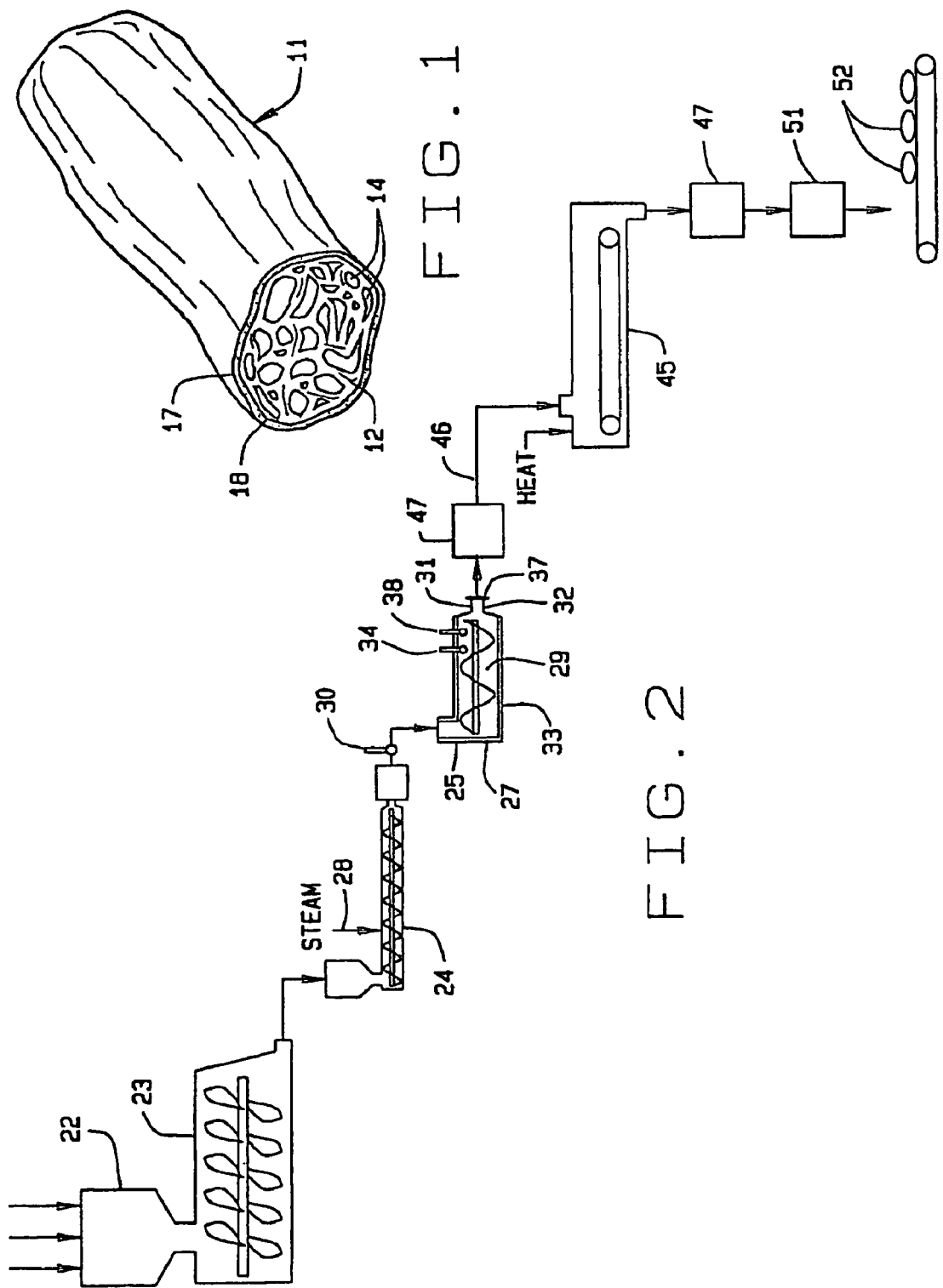

PUFFED PROTEIN BASED SNACK FOOD

CROSS-REFERENCE TO RELATED APPLICATION

This patent application is a continuation of U.S. patent application Ser. No. 10/987,918, filed Nov. 12, 2004, now abandoned, which is a continuation of U.S. patent application Ser. No. 09/969,678, filed Oct. 3, 2001, now abandoned.

BACKGROUND OF INVENTION

Much effort and many resources have been applied in the food industry to provide snack products that are both nutritious and convenient and will fulfill the organoleptic requirements of consumers as well as their desire to have a healthy diet. Many successes have been achieved in non-snack foods but nutritious snack foods have been more difficult to achieve. This may be partly due to the fact that oftentimes, it does not take a very large change in the formulation or the processing of food items to change their identity or characteristics and hence their acceptability to the consumer. Further, cereal grain based crisp snack foods such as chips are generally cooked at high temperatures which can adversely affect the nutritional value of the ingredients. The typical cooking process for crisp snack foods, particularly cereal grain based foods, is frying, which can result in a high level of fat intake for the consumer with its resulting nutritional problems. Further, in frying processes, sometimes it is difficult to control the amount of fat uptake into the products or keep the fat uptake at a low level while still providing a fully cooked and crisp product. For some consumers, high fat content in some foods is viewed as a negative and for some consumers it is viewed as part of a balanced diet. Examples of such snack food products are corn chips, potato chips and the like. In addition to the above discussed issues, these products are typically high in starch and low in protein. While such products have high organoleptic appeal to consumers, they also have drawbacks because of their low nutritional value and in many products, high levels of fat. Further, there is currently a belief that for weight control one should reduce carbohydrate intake and increase protein intake. High protein content products though have different organoleptic properties and appeal than carbohydrate based products.

Consumers vary in type and could be classed generally in three classes. The first class includes those who want a nutritious snack high in protein and low in fat. A second class includes those who want a balanced diet, balanced between protein, fat and carbohydrates. A third class includes those who want a diet very high protein content and a low carbohydrate diet but can contain even a relatively high amount of fat.

Alternative cooking methods have been provided for snack items, but do not have the same organoleptic appeal as fried products. Baked products have not met with the same success as their fried counterparts even with the drawbacks of the fried products. Further, typically, such foods have a high density and consumers tend to overeat such products since there visually appears to be very little product intake during the eating occasion. Very low density snack products have been provided such as popcorn and cheese curls to provide a large volume, low density snack. However, some of these products tend to be high in fat and/or low in protein content.

One problem encountered in making high protein items is the formation of fibers which is believed to be an interconnecting of protein molecules. The formation of fibers is very typical and is desirable. For example, textured vegetable protein is made fibrous to make meat analogues and the like. Such formation of fibers results in a chewy, tough product instead of a crisp and frangible food product as snack foods typically are.

Further, all proteins are not created equal for nutritional value. Currently, the United States Government is evaluating various proteins for their nutritional value in humans and their potential adverse effects on humans. For example, wheat gluten has been implicated in a condition called celiac sprue. Although gluten is nutritious, it can cause problems in some humans with their ability to digest and assimilate nutrients from foods. Further, the protein in peanuts has been implicated in severe (and sometimes fatal) allergic reactions in humans.

There is thus a need for an improved snack product having a high protein content which provides nutritional benefits to humans while using proteins that are generally healthy and safe and which finished product has good organoleptic properties particularly a reduced formation of protein fibers and has the ability to have a controlled fat content including low fat content.

SUMMARY OF INVENTION

The present invention involves the provision of a proteinacious food product formed by extrusion. The product is formed of protein and water that is extruded and puffed. Optionally, a filler such as carbohydrates can be included. The puffed product has sufficient structure for supporting its own weight during subsequent drying as by baking. The product is dried to a moisture content to provide a crisp or frangible product. The product is high in protein and preferably soy proteins including soy isolates and can be low in fat. The product is also characterized by the reduced or perceived lack of formation of proteinaceous fibers.

The invention also involves the provision of a method of making a puffed proteinaceous snack food product that is formed by mixing protein and water and forming it into a plastic mass in an extruder. Optionally, a filler such as carbohydrates can be included. The plastic mass is then extruded through a die opening and cut to the appropriate length. After exiting the extruder die, the extrudate puffs through the vaporization of water contained in the extrudate. The cut and puffed extrudate is then dried to a moisture content of less than about 7% by weight of protein, filler (if any is present) and water to form a dried formed product such that the dried formed product is crisp or frangible. The thus dried formed product can then be coated with flavorings and/or fats to provide a desired flavor profile such as a cheese flavor, a savory flavor, a sweet flavor, etc. to form a finished product with a controlled amount of fat.

BRIEF DESCRIPTION OF DRAWINGS

FIG. 1 is a perspective view of a puffed food product.

FIG. 2 is a flow chart diagram of a process of making the puffed food product of the invention.

Like numbers throughout the drawings illustrate like or similar parts or process steps.

DETAILED DESCRIPTION

Figure 3:
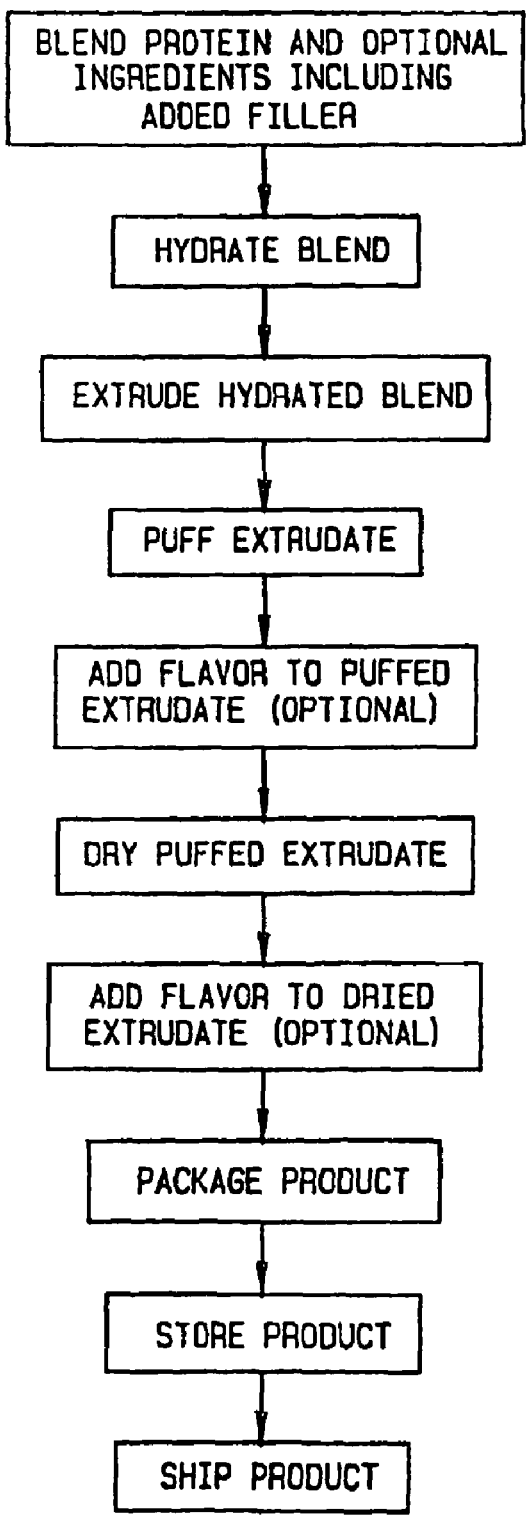
FIG. 3 is a schematic illustration of a processing line including an extruder, conveyor and oven.

A puffed food product 11 is formed having a continuous solids matrix 12 of protein, filler (if any) with air spaces 14. The product can contain water as well as a coating 17 that can be applied to the outer surface 18. The formed product is comprised of two major ingredients: protein and water plus filler as an optional ingredient and can have an optional coating 17 and other optional ingredients as described below. In the following description of the products, the percents given are by weight on a dry basis (except for water) unless otherwise specified. Formed product as used herein is that product that is formed by the extrudate including material added only during the extrusion process. Majority solids component consists of the protein and filler (if any).

The protein component is present by the combined weight of protein, filler (if any) and water in the dried formed product in the amount in the range of between about 25% and about 95% and described in more detail below. A preferred protein is protein derived from seed stock selected from the groups of cereal grains (e.g., wheat, corn, barley, etc.) and legumes (e.g., soy beans, peas, etc.) such as soy protein and preferably a blend of soy proteins some of which can be at least partially hydrolyzed and some of which can be unhydrolyzed. Soy protein may be in the form of soy isolate, soy concentrate or soy flour. In a preferred embodiment at least a majority of the protein is soy proteins and most preferably in the form of soy isolates. A preferred mixture of proteins includes soy isolates that are at least partially hydrolyzed and soy isolates that are fully gelling or unhydrolyzed plus soy concentrates and/or soy flour that can also be unhydrolyzed. A protein mixture is preferred at the ratio of the at least partially hydrolyzed soy isolates to the unhydrolyzed soy protein (including the unhydrolyzed soy isolates and/or soy concentrates and/or soy flour) is in the range of between about 80:20 and about 55:45 and may vary depending upon the type of product made as described below. Particularly preferred at least partially hydrolyzed proteins include Supro 670 from DuPont-PT1 and ProFam 873 from Archer Daniels Midland while a preferred fully gelling soy protein is Supro 620 or Supro EX33 from DuPont-PT1. The functionality of the protein may be altered if desired by a more hydrolyzed protein. A fully gelling (unhydrolyzed) soy protein including soy isolates may be defined as having a viscosity of greater than about 100 cp when 6% by weight is suspended in water. The term soy isolates is well known in the industry as defining specific types of proteins and are considered to have greater than about 90% protein on a dry basis. The protein is used preferably in powder form. Soy protein will usually contain, as purchased, some soy fiber which can be at least part of the filler (unadded) component. Soy fiber can remain without product detriment.

A preferred added filler for the solids matrix of protein and filler (if any) is carbohydrates and most preferably complex carbohydrates such as starch and/or soy fiber. As used herein, the term solids matrix is the protein and filler (if any) in the product. Preferred starches include rice flour, potato starch and tapioca and admixtures thereof. It is preferred that the starch have low flavor profile, moderate to high swelling power and low in amylose. Filler is present in the dried formed product in a ratio of filler to protein in the range of between about 0 to about 75:25, preferably in the range of between about 5:95 and about 75:25, and most preferably in the range of about 20:80 and about 65:35 by dry weight. Good luck has been achieved using RL100 rice flour (which contains starch) from Rivland. Preferably, at least a majority of the filler is starch. The protein and filler (if any) form a matrix of solids which forms a significant part of the finished product which also can include added fat, water and other minor ingredients. The solids matrix is at least about 80%, preferably at least about 85% and most preferably at least about 95% by weight of the dried formed product (excluding residual water).

Water is present in the finished product in the range of between about 1% and about 7%, preferably in the range of between about 3% and about 6%, and most preferably in the range of between about 3% and about 5% by weight of solids matrix and water. This moisture is the total moisture content in the finished product as measured by any suitable food moisture analyzer particularly one using a moisture probe. Such a low water level provides a crisp and frangible product and also a product with a low water activity level ($A_w$) which helps with microbiological stability during storage.

Flavoring can be added to the formed product and can be mixed with the solids water mixture prior to extrusion and/or may be applied directly as an external coating to the formed product after extrusion and drying. Optionally, the coating may be applied to the formed product prior to drying. Any suitable flavoring can be provided such as salt, dried cheese, etc. One coating is an oil-flavor mixture. Another form of coating is an oil-water-flavor emulsion. The flavoring in such an emulsion, for example, can be cheddar cheese. Other additives may be added to the coating to provide stability for the emulsion as is known in the art. The coating can be applied in a weight range of about 5% and about 25%, preferably in the range of between 10% and about 15%, and most preferably in the range of between about 13% and about 16% of the weight of the dried formed product prior to application of the coating thereto. It is preferred that the coating be formulated and applied in a manner that little if any of the water migrates from the coating into the dried formed product to help preserve crispness.

The flavoring can be applied by any one of numerous methods including spraying, dipping, drizzling, etc. as is well known in the art of food processing.

Other ingredients may be added to the product if desired before or after extrusion such as antimicrobial agents, nutrients, preservatives, calcium, etc. as known in the art.

It is preferred that prior to extrusion that no fat or minimal fat be added to the product. It is preferred to keep fat added to the solids and water mixture at a level of less than about 0.5%, preferably less than about 0.2%, and most preferably no added fat by weight of dried formed product.

If nutrients are added such as vitamins, minerals, etc., they can be added either to the mix prior to extrusion or applied to the surface after extrusion. In some cases, some nutrients are fat soluble and could be added by adding fat to the mixture in the extruder. Nutrients such as vitamins A, C, D, E, etc., calcium, can be added to help increase the nutritional value of the finished product.

As mentioned above products can be produced for different types of consumers which can be classed as the healthy diet consumer, the balanced diet consumer and the high protein consumer. The present invention allows the production of a wide variety of different types of products with the ability to provide products for each of the three mentioned types of consumers.

In the case of product the healthy diet consumer, the dried formed product has total protein (e.g., hydrolyzed and unhydrolyzed) in the range of between about 25% and 55%, by weight of dried formed product. The ratio of at least partially hydrolyzed soy isolates to unhydrolyzed or gelling protein is in the range of between about 80:20 to about 55:45 preferably in the range of between about 60:20 to about 60:45 and most preferably about 60:40. Filler, preferably a carbohydrate such as starch (a complex carbohydrate), is present in the range of between about 50% and 75% by weight of dried formed product. The total moisture content is present as described above coating can be applied to the dried formed product as described above. Also, the above mentioned optional ingredients can also be added, for example, nutrients, flavorants, anti-microbial agents, etc. The total fat content of the finished product, i.e., the dried formed product with flavoring and additives added thereto is less than about 5% and preferably in the range of between about 0.2% and about 5% by weight of finished product.

In the case of product for the balanced diet consumer, protein is present in the range of between about 55% and 70% by weight of dried formed product. The ratio of at least partially hydrolyzed soy isolates to the unhydrolyzed or gelling protein is in the range of between about 80:20 to about 55:45 and preferably about 70:30. Filler, preferably starch, is present in the range of between about 30% and 50% by weight of dried formed product. Typically, balanced diet consumers prefer a higher fat content since they view fat as an important element of a balanced diet. In this event, total fat in the finished product is in the range of between about 0.2% and about 20%, and preferably in the range of between about 15% and about 20% by weight of finished product. Most of the fat is preferably added with the coating since it is desirable to not mix the fat prior to extrusion in with the components of the product that are extruded. The other ingredients as mentioned for the healthy diet consumer can also be added to this product category in approximately the same amounts.

For the high protein diet consumer product, it is preferred to add little if any filler in order to increase the protein content and reduce the carbohydrate content which to some consumers is detrimental to a high protein diet. For such a product line, the protein is present in the range of between about 70% and 95% by weight of dried formed product. The ratio of at least partially hydrolyzed soy isolates to unhydrolyzed or gelling protein is in the range of between about 80:20 and about 55:45 and preferably about 70:30. Filler, is kept low and is present in the range of between about 0% and about 30%, preferably in the range of between about 5% and about 20% by weight of dried formed product. Fat, can be present in this type of product and would preferably be added with the coating. Fat is present in the range of between about 0.2% and about 30% and preferably in the range of between about 7% and about 20% by weight of finished product. Other optional ingredients as discussed above can be added to this type of product in approximately the same amounts.

The dried formed product has a density, based on the weight of solids matrix and water and exclusive of the weight of coating and flavorings, in the range of between about 0.02 g/cc and about 0.5 g/cc, preferably in the range of between about 0.02 g/cc and about 0.1 g/cc, and most preferably in the range of between about 0.02 g/cc and about 0.05 g/cc. The density can be calculated by weighing the product and dividing the weight by the volume of the weighed product.

The process of manufacturing the product is described below and is described as if filler is an ingredient (see FIG. 2). An admixture of the protein component and the filler component, if filler is used, is made such as by blending the two components in a mixer 23 fed from a bin 22. The admixture is then fed to a preconditioner 24 and then a feed hopper 25 of an extruder 27. Plasticizing agent(s), at least a portion of which is volatilizable at the extrudate temperature and pressure, such as water can be introduced into the admixture as at 28 in the preconditioner 24 prior to introduction into the hopper or while being fed through the hopper or while in the extruder barrel 29. The water can be liquid water and/or steam and can be added at more than one location. The temperature of the blend can be monitored by a temperature probes 30. The water content of the admixture is elevated to a water content in the range of between 15% and about 30% total water in the mixture to be extruded. The plasticizing agent, in addition to water can include polyhydric alcohol such as glycerol or the like and is added in an amount to permit formation of the plastic mass in the extruder barrel for mixing of the admixture into a uniform mixture having sufficient plasticity to allow extrusion of the mixture through the extruder to a forming die 31 at the outlet end 32 of the extruder. Any suitable food extruder can be used and a preferred extruder is a single or twin screw extruder with a short barrel. The extruder is capable of heating the admixture through the application of heat from a heating chamber 33 typically containing hot water (in a heating jacket) on the outside of the barrel of the extruder. The plastic mass is heated to a temperature hot enough to melt or pass through the glass transition temperature of the protein sufficiently to form a film and is at least about 95° F. and preferably in the range of between about 95° F. and about 255° F., more preferably in the range of between about 125° F. and about 255° F., and most preferably in the range of between about 175° F. and about 225° F. The temperature is measured with a thermocouple 34 positioned in the extruder barrel which actually measures the temperature of the barrel and not the material, but because of the thorough mixing and time spent in the extruder, the temperature of the material closely approximates the temperature of the barrel and is considered to be the temperature of the plastic mass at the thermocouple 34. The extruder is preferably a screw extruder as are well known in the food processing art. The mixed plasticized and heated mass is extruded through a die opening and is formed into an appropriate shape transverse to the direction of travel from the die and is then cut to an appropriate length by a rotating cutter 37 or the like. The pressure in the extruder is measured by a pressure sensor 38 at the die head. The pressure is at least about 400 psi and preferably in the range of between about 500 psi and about 800 psi, preferably in the range of between about 600 psi and about 800 psi, and more preferably in the range of between about 600 psi and about 700 psi.

Upon exiting the die 31, the heated water (volatilizable plasticizer) in the extrudate 39 changes to steam due to the pressure reduction upon exit of the extrudate from the extrude, effecting expansion or puffing of the extrudate. The volumetric expansion at the die is in the range of between about 2 and about 50 fold. The cross sectional area of the outlet openings in the die are preferably in the range of between about 0.015 in$^2$ and about 0.020 in$^2$, preferably in the range of between about 0.017 in$^2$ and about 0.019 in$^2$, and most preferably in the range of between about 0.0180 in$^2$ and about 0.0185 in$^2$.

During the extrusion process, the protein and starch are thermally processed (cooked). The protein is thermally processed to a degree such that the glass transition temperature for the protein is attained so that film formation can occur.

The filler when used helps prevent formation of a fibrous characteristic of the proteins which form when the protein molecules link together during the thermal processing. It is believed that with the conditions under which the materials are extruded in addition to using the filler and hydrolyzed protein, that the proteins do not polymerize but rather form weak bonds, perhaps ionic bonds, and are sufficient to hold the mass together once extruded and puffed but are not sufficient to form a fibrous characteristic typical of proteins when extruded and heat processed. The presence of fibers can be tested for by hydrating the dried formed product with water at a ratio of 1:3, dried formed product to water, and washing. The remaining material is texturized or fibrous. It is desired that the texturized product be less than about 10% by weight of protein started with. Testing can also be done organoleptically by chewing the product. Tougher, chewier products are an indication of the formation of fibers. The products from a consumer standpoint should have minimal if any tough, chewy characteristics.

The product after extrusion, puffing and cutting is transferred to a drying apparatus 45 via the conveyer 46. Preferably the drying apparatus 45 is a forced convection oven which will heat the cut pieces driving out the water or other volatilizable plasticizers to reduce the water content to the ranges described above. Any suitable form of drying apparatus may be used. A drier using multiple types of heat or energy sources may be used. In an oven, the oven temperature is preferably in the range of between 165° F. and about 350° F., preferably in the range of between 175° F. and about 300° F., and most preferably in the range of between 200° F. and about 300° F. depending on the residence time in the dryer.

Before or after drying, the dried pieces may then be conveyed through an applicator 47 for applying the coating if desired. The coating can be applied by spraying, tumbling or any other suitable application technique as is known in the art.

The finished pieces are then transferred to a packaging line 51 for placing the finished products into sealed packages 52 to preserve the product both in moisture content and hence its crisp eating texture as well as to provide product safety and microbial stability as is known in the art.

While the foregoing describes certain preferred embodiments of present invention, it is to be understood that modifications may be made to the invention and still provide a high proteins nutritious snack food product that has good organoleptic properties for the consumer. For example, while soy proteins are preferred because of the current government view on its benefits and functionality, other proteins may be found or may be available or because of future testing be found as desirable and can be used in addition to or in place of the specifically identified proteins. Further, fillers other than starch may be used to help prevent fiber formation in the product while still providing good eating characteristics.

The invention claimed is:

1. A protein extrudate comprising:
   from about 70% to about 95 wt. % soy protein, wherein the soy protein is a blend of soy proteins said blend of soy proteins comprising an unhydrolyzed soy protein and an at least partially hydrolyzed soy protein;
   the extrudate having a moisture content of less than about 7% by weight of the extrudate and a density in the range of about 0.02 g/cc to about 0.5 g/cc.

2. The extrudate as set forth in claim 1 further characterized by having a non-fibrous eating texture.

3. The extrudate as set forth in claim 1 wherein the extrudate includes fat applied at least to the surface of the extrudate in a range of from about 0.2% to about 30% of the total weight of the extrudate and includes flavor applied at least to an exterior surface of the extrudate.

4. The extrudate as set forth in claim 1 including filler present in an amount from about 5% to about 20% by weight of the extrudate.

5. The extrudate as set forth in claim 4 wherein at least a majority of the filler is starch.

6. The extrudate as set forth in claim 5 wherein the starch is present in a ratio of starch to protein of about 5:95 by dry weight.

7. The extrudate as set forth in claim 1 wherein the at least partially hydrolyzed soy protein includes an at least partially hydrolyzed soy isolate and the unhydrolyzed soy protein includes at least one of a soy isolate, soy concentrate and soy flour wherein the at least partially hydrolyzed soy protein and the unhydrolyzed soy protein are present in the ratio from about 80:20 to about 55:45.

8. The extrudate as set forth in claim 1 wherein the density of the extrudate is in the range of between about 0.02 g/cc and about 0.1 g/cc.

9. The extrudate as set forth in claim 1 wherein the density of the extrudate is in the range of between about 0.02 g/cc and about 0.05 g/cc.

10. The extrudate as set forth in claim 8 further comprising about 3% to about 5% water by weight of the extrudate.

11. A protein extrudate comprising:
    about 70% to about 95 wt. % soy protein, wherein the soy protein is a blend of soy proteins said blend of soy proteins comprising an unhydrolyzed soy protein and an at least partially hydrolyzed soy protein and wherein the at least partially hydrolyzed soy protein includes an at least partially hydrolyzed soy isolate and the unhydrolyzed soy protein includes at least one of a soy isolate, a soy concentrate and soy flour, and wherein the at least partially hydrolyzed soy protein and the unhydrolyzed soy protein are present in the ratio of about 80:20 to about 55:45;
    from 0 to about 20 wt. % filler;
    water in the range of between about 1% and about 7 wt. %; and
    the extrudate being characterized by having a crisp texture and a density in the range of between about 0.02 g/cc and about 0.5 g/cc.

12. The extrudate as set forth in claim 11 being further characterized by having a non-fibrous eating texture.

13. The extrudate as set forth in claim 11 further including fat applied at least to the surface of the extrudate in a range of about 0.2% to about 30% of the total weight of extrudate; and flavor applied at least to an exterior surface of the extrudate.

14. The extrudate as set forth in claim 13 wherein the fat applied at least to the surface of the extrudate is in a range of about 0.2% to about 20% of the total weight of the extrudate.

15. The extrudate as set forth in claim 14 wherein the fat applied at least to the surface of the extrudate is in a range of about 0.2% and about 5% of the total weight of the extrudate.

16. The extrudate as set forth in claim 11 wherein at least a majority of the filler is starch.

17. The extrudate as set forth in claim 11 wherein the density of the extrudate is in the range of about 0.02 g/cc to about 0.1 g/cc.

18. The extrudate as set forth in claim 17 wherein the density of the extrudate is in the range of about 0.02 g/cc to about 0.05 g/cc.

19. The extrudate as set forth in claim 17 further comprising about 3% to about 5% water by weight of the extrudate.

20. The extrudate as set forth in claim 4 wherein the filler comprises a carbohydrate.

21. The extrudate as set forth in claim 4 wherein the filler comprises a starch, soy fiber, or a mixture thereof.

22. The extrudate as set forth in claim 1 comprising from about 80% to about 95 wt. % protein.

23. The extrudate as set forth in claim 1 comprising from about 85% to about 95 wt. % protein.

24. The extrudate as set forth in claim 7 wherein the at least partially hydrolyzed soy protein includes an at least partially hydrolyzed soy isolate and the unhydrolyzed soy protein includes at least one of a soy isolate, soy concentrate and soy flour wherein the at least partially hydrolyzed soy protein and the unhydrolyzed soy protein are present in the ratio from about 80:20 to about 70:30.

25. The extrudate as set forth in claim 11 wherein the filler comprises a carbohydrate.

26. The extrudate as set forth in claim 11 wherein the filler comprises a starch, soy fiber, or a mixture thereof.

27. The extrudate as set forth in claim 11 comprising from about 80% to about 95 wt. % protein.

28. The extrudate as set forth in claim 11 comprising from about 85% to about 95 wt. % protein.

29. The extrudate as set forth in claim 11 wherein the at least partially hydrolyzed soy protein and the unhydrolyzed soy protein are present in the ratio from about 80:20 to about 70:30.

30. A food product comprising the extrudate of claim 1 and at least one of a flavoring, a fat, an antimicrobial agent, a nutrient, or a preservative.

31. The food product as set forth in claim 30 wherein the food product is a snack food.

32. A food product comprising the extrudate of claim 11 and at least one of a flavoring, a fat, an antimicrobial agent, a nutrient, or a preservative.

33. The food product as set forth in claim 32 wherein the food product is a snack food.

\* \* \* \* \*

UNITED STATES PATENT AND TRADEMARK OFFICE
CERTIFICATE OF CORRECTION

| | | |
|---|---|---|
| PATENT NO. | : 8,293,317 B2 | Page 1 of 1 |
| APPLICATION NO. | : 12/288369 | |
| DATED | : October 23, 2012 | |
| INVENTOR(S) | : Fannon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 405 days.

Signed and Sealed this
Twenty-ninth Day of December, 2015

Michelle K. Lee
*Director of the United States Patent and Trademark Office*